US009588275B2

(12) United States Patent
Li et al.

(10) Patent No.: US 9,588,275 B2
(45) Date of Patent: Mar. 7, 2017

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventors: Quan Li, Guangdong (CN); Yuchun Hsiao, Guangdong (CN); Guofu Tang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 140 days.

(21) Appl. No.: 14/370,771

(22) PCT Filed: Jun. 10, 2014

(86) PCT No.: PCT/CN2014/079618
§ 371 (c)(1),
(2) Date: Jul. 5, 2014

(87) PCT Pub. No.: WO2015/184651
PCT Pub. Date: Dec. 10, 2015

(65) Prior Publication Data
US 2015/0355400 A1    Dec. 10, 2015

(30) Foreign Application Priority Data

Jun. 4, 2014 (CN) .......................... 2014 1 0245822

(51) Int. Cl.
G02F 1/1335 (2006.01)
F21V 8/00 (2006.01)

(52) U.S. Cl.
CPC ......... *G02B 6/0026* (2013.01); *G02B 6/0023* (2013.01); *G02B 6/0088* (2013.01);
(Continued)

(58) Field of Classification Search
CPC ......... G02F 1/133615; G02F 1/133608; G02F 2001/133614
See application file for complete search history.

(56) References Cited

U.S. PATENT DOCUMENTS 9,201,266 B2 * 12/2015 Hur .................. G02F 1/133603
2011/0037920 A1 * 2/2011 Kim .................. G02F 1/133608
349/58
(Continued)

FOREIGN PATENT DOCUMENTS

| CN | 103775925 A | | 5/2014 |
| CN | 103823320 A | * | 5/2014 |
| KR | 20120068499 A | | 6/2012 |

*Primary Examiner* — Kendrick Hsu
(74) *Attorney, Agent, or Firm* — Andrew C. Cheng

(57) ABSTRACT

This invention discloses a backlight module comprises a light guide plate, a middle frame, a quantum strip, and a light source disposed approximate to a light input surface of the light guide plate. The middle frame comprises a supporting portion and a containing portion connecting to the supporting portion, the supporting portion is disposed on a light output surface of the light guide plate, and the containing portion is disposed between the light source and the light input surface. The containing portion comprises a containing space, the quantum strip is disposed in the containing space, the a light transmitting hole is disposed on a first sidewall and a second sidewall of the containing portion for transmitting light from the light source via the quantum strip to radiate the light input surface of the light guide plate. This invention also discloses a liquid crystal display device comprises the above mentioned backlight module. The display device and backlight module in this invention is easy for assembly and reduces the risk of broking the quantum strip. The production yield is improved.

6 Claims, 3 Drawing Sheets

(52) U.S. Cl.
CPC ...... *G02F 1/1336* (2013.01); *G02F 1/133608* (2013.01); *G02F 2001/133614* (2013.01)

(56) References Cited

U.S. PATENT DOCUMENTS

| | | | | |
|---|---|---|---|---|
| 2013/0271961 A1* | 10/2013 | Nakamura | ................ | F21V 9/00 |
| | | | | 362/97.2 |
| 2013/0329161 A1* | 12/2013 | Park | .................. | G02F 1/133615 |
| | | | | 349/58 |
| 2013/0336003 A1* | 12/2013 | Yang | ........................ | G02B 6/42 |
| | | | | 362/608 |
| 2015/0219822 A1* | 8/2015 | Lee | ...................... | G02B 6/0023 |
| | | | | 362/608 |

* cited by examiner

BACKLIGHT MODULE AND LIQUID CRYSTAL DISPLAY DEVICE

TECHNICAL FIELD

The present invention is related to the field of liquid crystal display, and more particular to a liquid crystal display device and a backlight module with a quantum strip.

DESCRIPTION OF RELATED ART

In the conventional liquid crystal display device, the while LED, usually used as a light source, is assembled with a light guide plate and optical films to form a backlight module. With the higher requirement of color field, color saturation and power consumption of the display device, the high color field, high color saturation and white light source solutions comprises (1) using red, green and blue phosphors with UV LEDs; (2) using red and green phosphors with blue LEDs; and (3) using red LEDs, green LEDs, and blue LEDs. However, those solutions suffers the low yield and high cost.

Quantum Dot (QD) technology is to confine electrons in certain region of the semiconductor structures which are assembled with 1-100 nm compound crystallines. In this technology, the light color is precisely controlled by adjusting the wavelength of light through the different size of the compound crystalline. Therefore, the quantum dot materials are widely applied in the backlight modules. High frequency light sources, such as blue LEDs, are used instead of conventional white LEDs. The high frequency light source radiates the quantum dot materials to stimulate light with different wavelength. The color of light becomes adjustable by controlling the crystalline size of the quantum dot material to achieve the requirement of the high color field backlight modules. However, how to fix the quantum dot material in the backlight modules becomes a new challenge in this technology fields.

SUMMARY

This invention provides a backlight module comprises a light guide plate, a middle frame, a quantum strip, and a light source disposed approximate to a light input surface of the light guide plate. The middle frame comprises a supporting portion and a containing portion connecting to the supporting portion, the supporting portion is disposed on a light output surface of the light guide plate, and the containing portion is disposed between the light source and the light input surface. The containing portion comprises a containing space, the quantum strip is disposed in the containing space, the a light transmitting hole is disposed on a first sidewall and a second sidewall of the containing portion for transmitting light from the light source via the quantum strip to radiate the light input surface of the light guide plate.

According to the present embodiment of this invention, wherein a plurality of light transmitting holes are located on both the first sidewall and the second sidewall accordingly, and the contact holes in the first sidewall are corresponding to the contact holes in the second sidewall.

According to the present embodiment of this invention, wherein only one light transmitting hole is disposed on the first sidewall and the second sidewall accordingly.

According to the present embodiment of this invention, wherein a bottom of the containing portion is open, and the bottom portion of the first sidewall and the second sidewall comprises a protrusion mesa extending inwardly for supporting the quantum strip.

According to the present embodiment of this invention, wherein the backlight module further comprise a buffer portion and a fixing portion, wherein the fixing portion is fixed the bottom portion of the first sidewall and the second sidewall, and the buffer portion is disposed between protrusion mesa and the fixing portion.

This invention also provides a liquid crystal display device comprise a backlight module and a liquid crystal panel disposed on the backlight module. The backlight module comprises a light guide plate, a middle frame, a quantum strip, and a light source disposed approximate to a light input surface of the light guide plate. The middle frame comprises a supporting portion and a containing portion connecting to the supporting portion, the supporting portion is disposed on a light output surface of the light guide plate, and the containing portion is disposed between the light source and the light input surface. The containing portion comprises a containing space, the quantum strip is disposed in the containing space, the a light transmitting hole is disposed on a first sidewall and a second sidewall of the containing portion for transmitting light from the light source via the quantum strip to radiate the light input surface of the light guide plate.

According to the present embodiment of this invention, wherein a plurality of light transmitting holes are located on both the first sidewall and the second sidewall accordingly, and the contact holes in the first sidewall are corresponding to the contact holes in the second sidewall.

According to the present embodiment of this invention, wherein only one light transmitting hole is disposed on the first sidewall and the second sidewall accordingly.

According to the present embodiment of this invention, wherein a bottom of the containing portion is open, and a bottom portion of the first sidewall and the second sidewall comprises a protrusion mesa extending inwardly for supporting the quantum strip.

According to the present embodiment of this invention, wherein the backlight module further comprise a buffer portion and a fixing portion, wherein the fixing portion is fixed the bottom portion of the first sidewall and the second sidewall, and the buffer portion is disposed between protrusion mesa and the fixing portion.

The display device and backlight module in this invention is easy for assembly and reduces the risk of broking the quantum strip. The production yield is improved.

BRIEF DESCRIPTION OF THE DRAWINGS

The invention is best understood from the following detailed description when read in connection with the accompanying drawings, which illustrate an embodiment of the present invention.

DETAILED DESCRIPTION OF EMBODIMENTS

The present invention will now be described more specifically with reference to the following embodiments. It is to be noted that the following descriptions of embodiments are presented herein for purpose of illustration and description only. It is not intended to be exhaustive or to be limited to the precise form disclosed.

Figure 1:
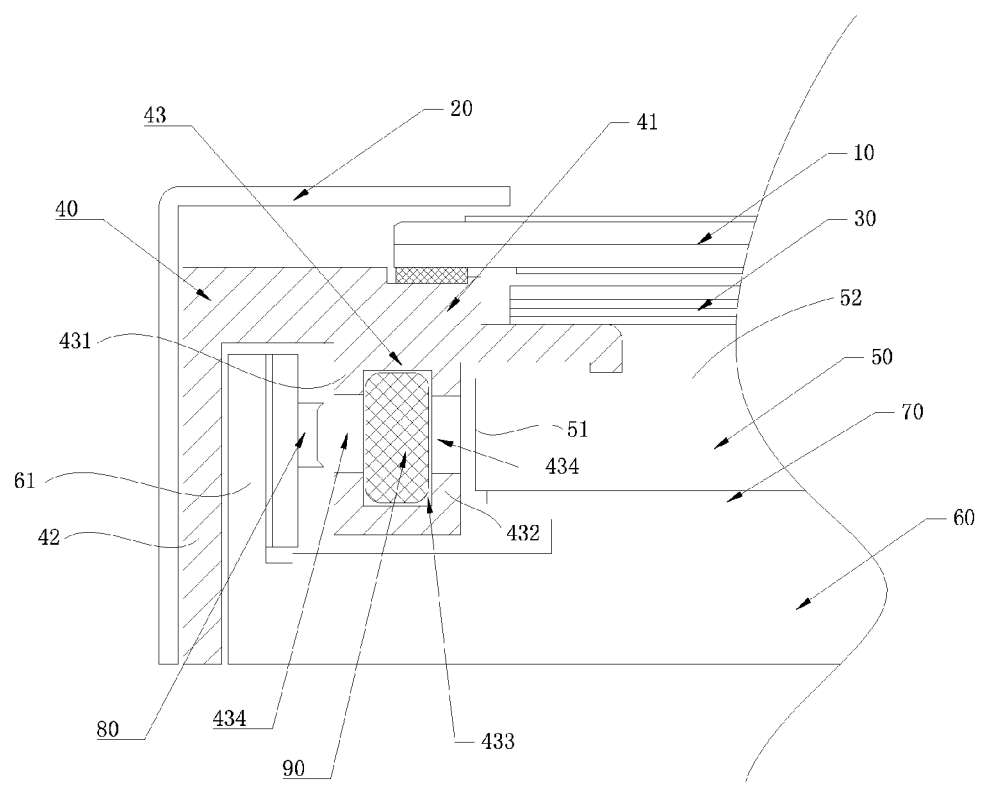
FIG. 1 shows the cross-sectioned view of the first embodiment of a liquid crystal display device in this invention.
Figure 2:
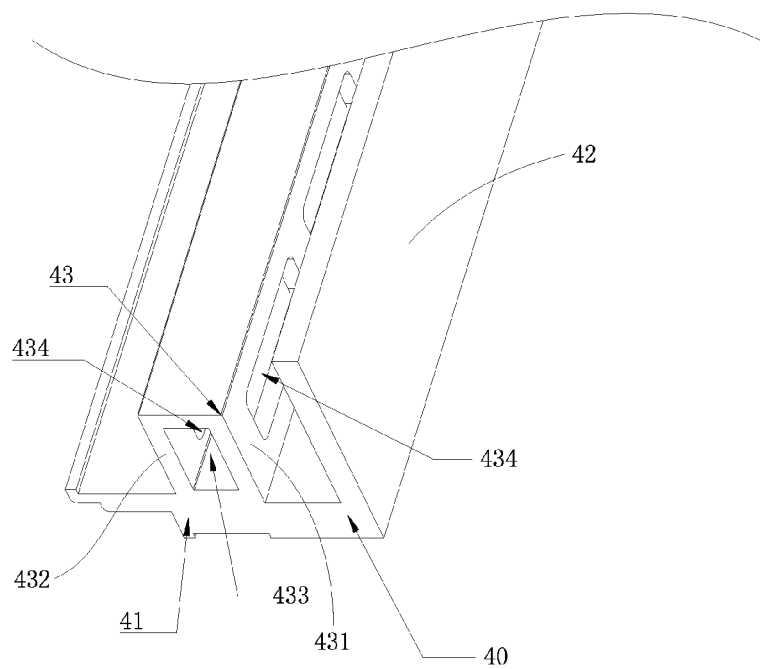
FIG. 2 shows three dimensioned view of a middle frame of the first embodiment.

FIG. 1 shows the cross-sectioned view of the first embodiment of a liquid crystal display device in this invention, and FIG. 2 shows three dimensioned view of a middle frame of the first embodiment.

With reference to FIG. 1 and FIG. 2, the first embodiment of the present invention comprises a liquid crystal display panel 10, a outer frame 20 and a backlight module. The liquid crystal display panel 10 is disposed on the backlight module, and the outer frame 20 is attached with the backlight module for fixing the liquid crystal display panel 10 on the backlight module.

In the present embodiment, the backlight module comprises an optical film 30, a middle frame 40, a light guide panel 50, a rear frame 60, a reflector 70, a light source 80 and a quantum strip 90.

The light guide panel 50 is disposed within the rear frame 60, and the reflector 70 is disposed between the light guide panel 50 and the rear frame 60. The light source 80 is located on a sidewall 61 of the rear frame 60, wherein the light source is approximate to a light input surface 51 of the light guide plate 50.

The middle frame 40, for example, could be formed by plastic materials. The middle frame 40 comprises a supporting portion 41, and a sidewall 42 connected with one end of the supporting portion 41, and a containing portion 43 connected with another end of the supporting portion 41. The containing portion 43 is paralleled with the sidewall 42. Besides, the supporting portion 41 is disposed on a light output surface 52 of the light guide plate 50 for supporting the optical film 30 and the liquid crystal display panel 10.

The sidewall 42 of the middle frame 40 and the sidewall 61 of the rear frame 60 are fixed with each other for attaching the light guide plate 50 and the reflector 70 within the rear frame 60. The liquid crystal panel 10 is pressed by the outer frame 20, and the sidewall 42 of the middle frame are attached to the outer frame 20 for fixing the liquid crystal panel 10 and the optical film 30 between the outer frame 20 and the middle frame 30.

The containing portion 43 is disposed between the light source 80 and the light input surface 51 of the light guide plate 50. The containing portion 43 comprises a containing space 433 with two open ends. There are two sidewalls in the containing spaces 433, wherein a first sidewall 431 is the sidewall faced toward the light source 80, and a second sidewall 432 is the sidewall away from the light source 80. Light transmitting holes 434 are disposed on both the first sidewall 431 and the second sidewall 432 of the containing space 433. The quantum strip 90 is disposed in the containing space 433, and light emitted from the light source 80 pass through the quantum strip to radiate on the light input surface 51 of the light guide plate 50.

In the present embodiment, the light source 80 could be a LED strip assembled by a plurality of high frequency LEDs. The quantum strip is a cuboid-shaped glass tube filled with quantum dot materials. The high frequency LED light source radiate the cuboid-shaped glass tube filled with quantum dot materials to stimulate light with different wavelength to form a white backlight source for the liquid crystal display device.

Besides, in the another embodiment, a plurality of light transmitting holes 434 are disposed both on the first sidewall 431 and the second sidewall 432 of the containing portion 43. Moreover, the light transmitting holes 434 on the first sidewall 431 are corresponding to the light transmitting holes 434 on the second sidewall 432. The amount of the light transmitting holes 434 on the first sidewall 431 (or the light transmitting holes 434 on the second sidewall 432) is the same as the amount of the LEDs in the light source 80. The size of the light transmitting hole 434 is substantially the same as the LED.

Figure 3:
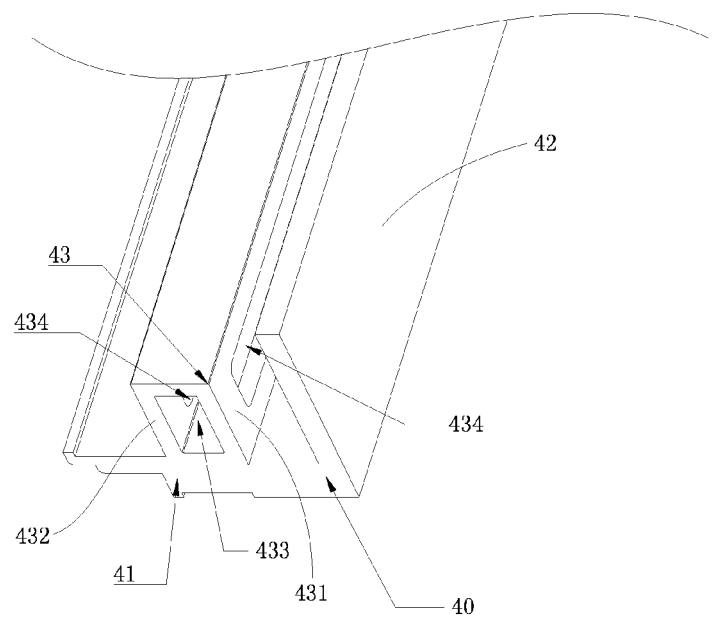
FIG. 3 shows three dimensioned view of a middle frame of the second embodiment of this invention.

FIG. 3 shows three dimensioned view of a middle frame of the second embodiment of this invention.

With reference to FIG. 3, the differences between the first and the second embodiment are listed as below:

There are only one light transmitting hole 434 on the first sidewall 431 and the second sidewall 432 of the containing portion 43 accordingly. The location of the light transmitting hole 434 on the first sidewall 431 is corresponding to the light transmitting hole 434 on the second sidewall 432. The light emitted from the light source 80 passes through the light transmitting hole 434 on the first sidewall 431 to radiate the quantum material in the quantum strip 90 to stimulate colored light. The colored light passes through the light transmitting hole 434 on the second sidewall 432 and radiates on the light input surface 51 of the light guide plate 50.

Besides, in this embodiment, the light transmitting hole 434 on the first sidewall 431 is corresponding to all LEDs in the light source 80.

Figure 4:
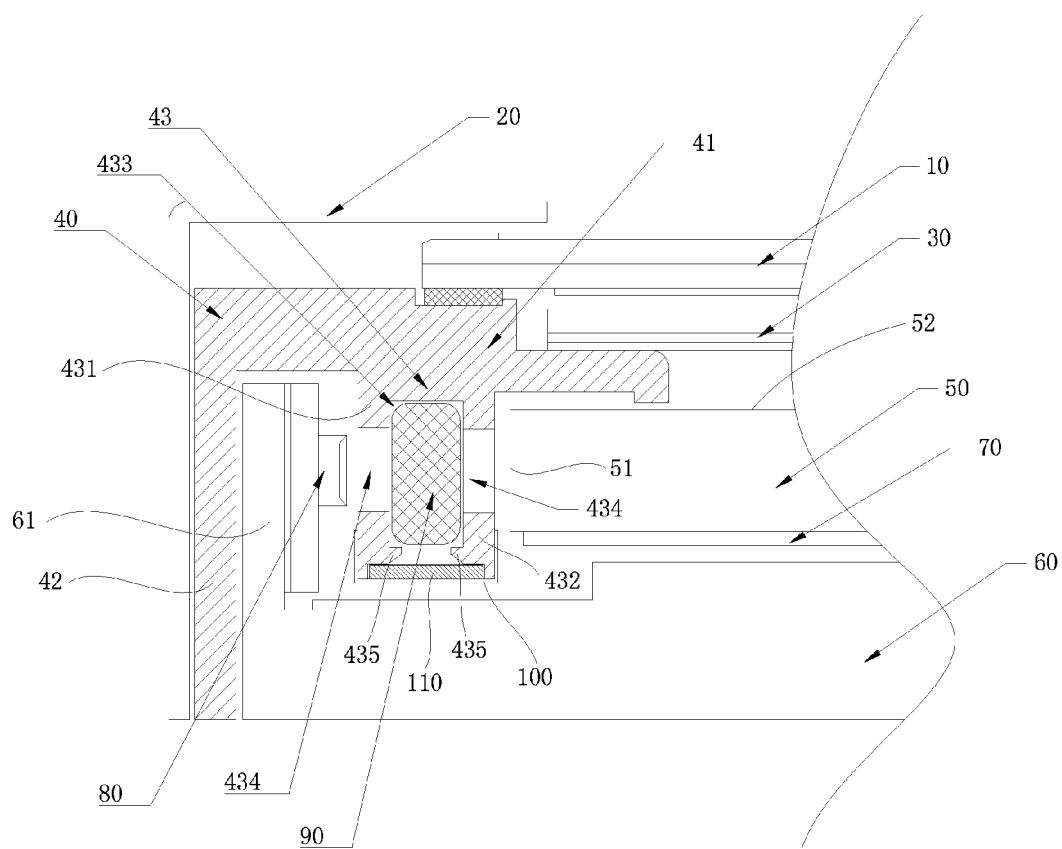
FIG. 4 shows the cross-sectioned view of the third embodiment of a liquid crystal display device in this invention.
Figure 5:
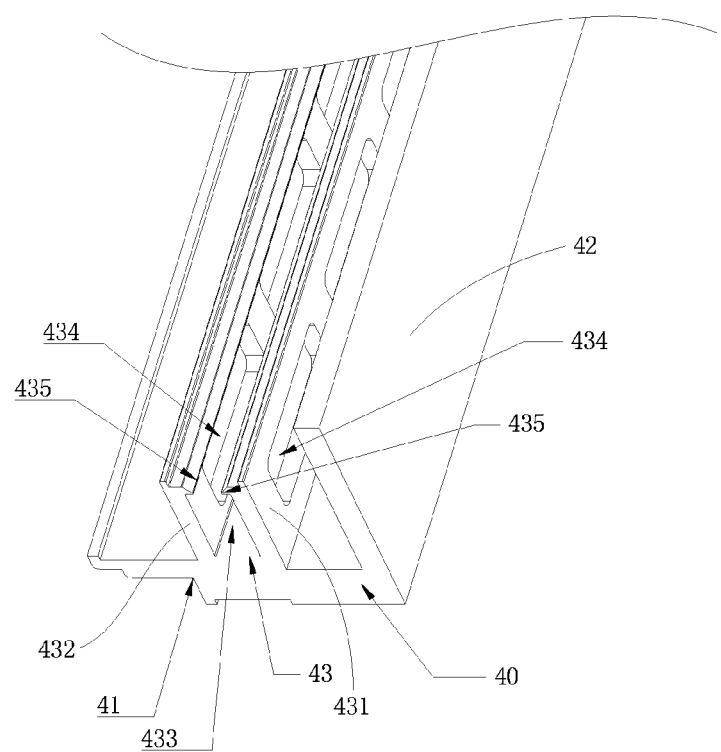
FIG. 5 shows three dimensioned view of a middle frame of the third embodiment.

FIG. 4 shows the cross-sectioned view of the third embodiment of a liquid crystal display device in this invention, and FIG. 5 the three dimensioned view of a middle frame of the third embodiment.

With reference to FIG. 4 and FIG. 5, the difference between the first and the third embodiment is the bottom portion of the containing portion 43 of the middle frame 40 is open. In other words, the containing portion 43 of the middle frame is open in one end to form a U-shaped groove. Besides, to support the quantum strip disposed in the containing portion and to prevent the quantum strip 90 slides out from the opening region of the U-shaped groove, protrusion mesas 435 are disposed on the bottom portion of the first sidewall 431 and the second sidewall 432, and the protrusion mesas 435 extend inwardly from the first sidewall 431 and the second sidewall 432 to hold the quantum strip 90.

Besides, the present embodiment of the backlight module further comprises a fixing portion 100 for structural stability and reliability of the quantum strip 90 in the containing space 433. The fixing portion 100 is fixed to the bottom portion of the first sidewall 431 and the second sidewall 432. The fixing portion could be one or more in the present embodiment.

The quantum strip 90 is a glass tube filled with quantum dot materials. Therefore, the present embodiment of backlight module further comprises a buffer portion 110 to prevent the glass tube from broking due to the hard contact. The buffer portion 110 is disposed between the protrusion mesa 435 and the fix portion 100.

Figure 6:
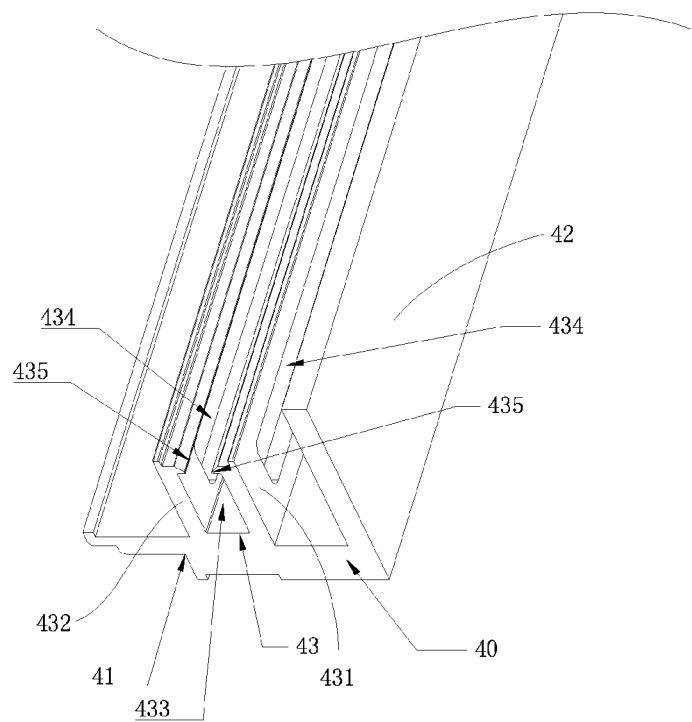
FIG. 6 shows three dimensioned view of a middle frame of the fourth embodiment.

FIG. 6 shows three dimensioned view of a middle frame of the fourth embodiment.

With reference to FIG. 6, the difference between the present embodiment and the third is that only one light transmitting hole 434 is disposed on the first sidewall 431, faced toward the light input surface 51 of the light guide plate 50, and the second sidewall 432 of the containing portion 43 accordingly. The light transmitting hole 434 on the first sidewall 431 is corresponding to the light transmitting hole 434 on the second sidewall 432. The light emitted from the light source 80 passes through the light transmitting hole 434 on the first sidewall 431 to radiate the quantum material in the quantum strip 90 to stimulate colored light. The colored light passes through the light transmitting hole 434 on the second sidewall 432 and radiates on the light input surface 51 of the light guide plate 50.

Besides, in this embodiment, the light transmitting hole 434 on the first sidewall 431 is corresponding to all LEDs in the light source 80.

Although the description above contains many specificities, these should not be construed as limiting the scope of the embodiment but as merely providing illustrations of some of the presently preferred embodiments. Rather, the scope of the invention is to be determined only by the appended claims and their equivalents.

What is claimed is:

1. A backlight module, comprising:
   a light guide plate;
   a middle frame;
   a quantum strip; and
   a light source, disposed approximate to a light input surface of the light guide plate;
   wherein the middle frame comprises a supporting portion and a containing portion connecting to the supporting portion, the supporting portion is disposed on a light output surface of the light guide plate, and the containing portion is disposed between the light source and the light input surface,
   wherein the containing portion comprises a containing space, the quantum strip is disposed in the containing space, a light transmitting hole is disposed on a first sidewall and a second sidewall of the containing portion for transmitting light from the light source via the quantum strip to radiate the light input surface of the light guide plate;
   wherein a bottom of the containing portion of the middle frame is open, and the bottom portion of the first sidewall and the second sidewall comprises a protrusion mesa extending inwardly for supporting the quantum strip;
   wherein the second sidewall has an opening between a part of the second sidewall and another part of the second sidewall, a fixing portion is fixed between the part of the second sidewall and another part of the second sidewall, and a buffer portion is disposed between the protrusion mesa and the fixing portion;
   the part of the second sidewall and the another part of the second sidewall composing an area only below the light transmitting hole.

2. The backlight module according to claim 1, wherein the light transmitting hole is a plurality of light transmitting holes-located on both the first sidewall and the second sidewall accordingly, and the containing space in the first sidewall are corresponding to the containing space in the second sidewall.

3. The backlight module according to claim 1, wherein only one light transmitting hole is disposed on the first sidewall and the second sidewall accordingly.

4. A liquid crystal display device, comprising
   a backlight module; and
   a liquid crystal display panel, disposed on the backlight module;
   wherein the backlight module comprises a light guide plate, a middle frame;
   a quantum strip; and a light source disposed approximate to a light input surface of the light guide plate;
   wherein the middle frame comprises a supporting portion and a containing portion connecting to the supporting portion, the supporting portion is disposed on a light output surface of the light guide plate, and the containing portion is disposed between the light source and the light input surface,
   wherein the containing portion comprises a containing space, the quantum strip is disposed in the containing space, the a light transmitting hole is disposed on a first sidewall and a second sidewall of the containing portion for transmitting light from the light source via the quantum strip to radiate the light input surface of the light guide plate;
   wherein a bottom of the containing portion of the middle frame is open, and the bottom portion of the first sidewall and the second sidewall comprises a protrusion mesa extending inwardly for supporting the quantum strip;
   wherein the second sidewall has an opening between a part of the second sidewall and another part of the second sidewall, a fixing portion is fixed between the part of the second sidewall and another part of the second sidewall, and a buffer portion is disposed between the protrusion mesa and the fixing portion;
   the part of the second sidewall and the another part of the second sidewall composing an area only below the light transmitting hole.

5. The liquid crystal display device according to claim 4, wherein the light transmitting hole is a plurality of light transmitting holes located on both the first sidewall and the second sidewall accordingly, and the containing space in the first sidewall are corresponding to the containing space in the second sidewall.

6. The liquid crystal display device according to claim 4, wherein only one light transmitting hole is disposed on the first sidewall and the second sidewall accordingly.

* * * * *